United States Patent
Kumamoto

(10) Patent No.: US 11,341,931 B2
(45) Date of Patent: May 24, 2022

(54) DISPLAY APPARATUS, METHOD FOR CONTROLLING DISPLAY APPARATUS, IMAGE OUTPUTTING APPARATUS, AND DISPLAY SYSTEM

(71) Applicant: SEIKO EPSON CORPORATION, Tokyo (JP)

(72) Inventor: Osamu Kumamoto, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 81 days.

(21) Appl. No.: 16/658,654

(22) Filed: Oct. 21, 2019

(65) Prior Publication Data

US 2020/0126505 A1   Apr. 23, 2020

(30) Foreign Application Priority Data

Oct. 19, 2018   (JP) .............................. JP2018-197761

(51) Int. Cl.
G09G 5/00   (2006.01)
(52) U.S. Cl.
CPC ......... G09G 5/003 (2013.01); G09G 2340/16 (2013.01)
(58) Field of Classification Search
CPC ............... G09G 5/003; G09G 2340/16; G09G 2370/22; G09G 2330/026; G09G 2370/04; H04N 9/3141; G06F 3/14
See application file for complete search history.

(56) References Cited

U.S. PATENT DOCUMENTS

2005/0002000 A1*   1/2005   Salvatori ............. G03B 21/145
                                                  353/119
2006/0203133 A1*   9/2006   Fujiwara ................ H04N 21/47
                                                  348/744
2007/0067430 A1*   3/2007   Hirata ..................... H04L 69/24
                                                  709/223
2012/0057061 A1*   3/2012   Osaka .................... G03B 17/54
                                                  348/333.1
2014/0362294 A1*   12/2014  Majid .................. H04N 21/485
                                                  348/564
2019/0058807 A1*   2/2019   Kobata ............. H04N 1/00904

FOREIGN PATENT DOCUMENTS

JP   2013-225741 A   10/2013
JP   2016-054485 A   4/2016

* cited by examiner

Primary Examiner — Patrick N Edouard
Assistant Examiner — Joseph P Fox
(74) Attorney, Agent, or Firm — Dority & Manning, P.A.

(57) ABSTRACT

A projector includes a projection section, a first connector to which an image outputting apparatus that outputs first image information is connectable, an activation instructor that instructs activation of the image outputting apparatus, a detector that detects that the activation of the image outputting apparatus has been completed, an image storage that stores second image information, and a display controller that causes the projection section to display a second image corresponding to the second image information when the detector does not detect that the activation of the image outputting apparatus has been completed and causes the projection section to display a first image corresponding to the first image information when the detector detects that the activation of the image outputting apparatus has been completed.

15 Claims, 9 Drawing Sheets

DISPLAY APPARATUS, METHOD FOR CONTROLLING DISPLAY APPARATUS, IMAGE OUTPUTTING APPARATUS, AND DISPLAY SYSTEM

The present application is based on, and claims priority from JP Application Serial Number 2018-197761, filed Oct. 19, 2018, the disclosure of which is hereby incorporated by reference herein in its entirety.

BACKGROUND

1. Technical Field

The present disclosure relates to a display apparatus, a method for controlling the display apparatus, an image outputting apparatus, and a display system.

2. Related Art

A projector includes a communication section that communicates with an image supplying apparatus and a control section that transmits control information for controlling the action of the image supplying apparatus via the communication section. The control section transmits first control information that instructs activation of the image supplying apparatus to the image supplying apparatus. After the image supplying apparatus is activated based on the first control information, the control section transmits second control information that activates an image transmission program to the image supplying apparatus. The image transmission program is a program that is stored in the image supplying apparatus and transmits image information to the projector.

In the projector described in JP-A-2013-225741, however, no video images can be displayed because no image is supplied to the projector until the image supplying apparatus is activated. Unless video images are displayed, a user cannot grasp the status of the activation of the image supplying apparatus or the projector. As a result, the user's convenience is insufficient in some cases.

An advantage of some aspects of the present disclosure is to provide a display apparatus, a method for controlling the display apparatus, an image outputting apparatus, and a display system capable of improving a user's convenience.

SUMMARY

An aspect of the present disclosure is directed to a display apparatus including a display section, a first connector to which an image outputting apparatus that outputs first image information is connectable, an activation instructor that instructs activation of the image outputting apparatus connected to the first connector, a detector that detects that the activation of the image outputting apparatus has been completed, an image storage that stores second image information, and a display controller that causes the display section to display a second image corresponding to the second image information when the detector does not detect that the activation of the image outputting apparatus has been completed and causes the display section to display a first image corresponding to the first image information when the detector detects that the activation of the image outputting apparatus has been completed.

In the display apparatus described above, the second image may be an image showing that the activation of the image outputting apparatus has not been completed.

In the display apparatus described above, the activation instructor may instruct the activation of the image outputting apparatus when activation of the display apparatus is initiated.

In the display apparatus described above, the activation instructor may send instruction information representing that the activation of the image outputting apparatus is initiated to the image outputting apparatus when the activation of the display apparatus is initiated, the detector may receive completion information representing that the activation of the image outputting apparatus has been completed from the image outputting apparatus when the activation of the image outputting apparatus has been completed, and the detector may detect that the activation of the image outputting apparatus has been completed when the detector receives the completion information from the image outputting apparatus.

The display apparatus described above may further include a second connector and a selector that selects the first or second connector, and the activation instructor may instruct the activation of the image outputting apparatus connected to the first connector when the selector selects the first connector.

In the display apparatus described above, when a state in which the selector selects the second connector transitions to a state in which the selector selects the first connector, the activation instructor may instruct the activation of the image outputting apparatus.

In the display apparatus described above, when the state in which the selector selects the second connector transitions to the state in which the selector selects the first connector, the activation instructor may send instruction information representing that the activation of the image outputting apparatus connected to the first connector is initiated to the image outputting apparatus, the detector may receive completion information representing that the activation of the image outputting apparatus connected to the first connector has been completed from the image outputting apparatus when the activation of the image outputting apparatus has been completed, and the detector may detect that the activation of the image outputting apparatus connected to the first connector has been completed when the detector receives the completion information from the image outputting apparatus.

In the display apparatus described above, the second connector may be so configured that the image outputting apparatus is connectable thereto, and when a state in which the selector selects the first connector transitions to a state in which the selector selects the second connector, the activation instructor may instruct the activation of the image outputting apparatus connected to the second connector.

In the display apparatus described above, the second connector may be so configured that the image outputting apparatus is connectable thereto, and the activation instructor may instruct the activation of the image outputting apparatus when the image outputting apparatus is connected to the second connector.

In the display apparatus described above, the display apparatus may be a projector.

In the display apparatus described above, the first connector may be an HDMI connector.

Another aspect of the present disclosure is directed to a method for controlling a display apparatus including a display section, a first connector to which an image outputting apparatus that outputs first image information is connectable, and an image storage that stores second image information, the method including an activation instruction step of instructing activation of the image outputting apparatus connected to the first connector, a detection step of detecting that the activation of the image outputting apparatus has been completed, a first display control step of causing the display section to display a first image corresponding to the first image information when the completion of the activation of the image outputting apparatus is detected in the detection step, and a second display control step of causing the display section to display a second image corresponding to the second image information when the completion of the activation of the image outputting apparatus is not detected in the detection step.

In the method for controlling a display apparatus described above, the second image may be an image showing that the activation of the image outputting apparatus has not been completed.

In the method for controlling a display apparatus described above, the activation of the image outputting apparatus may be instructed in the activation instruction step when activation of the display apparatus is initiated.

In the method for controlling a display apparatus described above, instruction information representing that the activation of the image outputting apparatus is initiated may be sent to the image outputting apparatus in the activation instruction step when the activation of the display apparatus is initiated, completion information representing that the activation of the image outputting apparatus has been completed may be received from the image outputting apparatus in the detection step when the activation of the image outputting apparatus has been completed, and the completion of the activation of the image outputting apparatus may be detected in the detection step when the completion information is received from the image outputting apparatus.

In the method for controlling a display apparatus described above, the display apparatus may further include a second connector, the method for controlling a display apparatus may further includes a selection step of selecting the first or second connector, and when the first connector is selected in the selection step, the activation of the image outputting apparatus connected to the first connector may be instructed in the activation instruction step.

In the method for controlling a display apparatus described above, when a state in which the second connector is selected in the selection step transitions to a state in which the first connector is selected in the selection step, the activation of the image outputting apparatus may be instructed in the activation instruction step.

In the method for controlling a display apparatus described above, when the state in which the second connector is selected in the selection step transitions to the state in which the first connector is selected in the selection step, instruction information representing that the activation of the image outputting apparatus connected to the first connector is initiated may be sent to the image outputting apparatus in the activation instruction step, completion information representing that the activation of the image outputting apparatus connected to the first connector has been completed may be received from the image outputting apparatus in the detection step when the activation of the image outputting apparatus has been completed, and the completion of the activation of the image outputting apparatus connected to the first connector may be detected in the detection step when the completion information is received from the image outputting apparatus.

In the method for controlling a display apparatus described above, the second connector may be so configured that the image outputting apparatus is connectable thereto, and when a state in which the first connector is selected in the selection step transitions to a state in which the second connector is selected in the selection step, the activation of the image outputting apparatus connected to the second connector may be instructed in the activation instruction step.

Still another aspect of the present disclosure is directed to an image outputting apparatus that is configured to be connectable to a connector of a display apparatus and outputs image information to the display apparatus, the image outputting apparatus including a controller that initiates activation of the image outputting apparatus upon reception of instruction information representing that the activation of the image outputting apparatus is initiated from the display apparatus and sends completion information representing that the activation of the image outputting apparatus has been completed to the display apparatus via the connector when the activation of the image outputting apparatus is completed.

Still another aspect of the present disclosure is directed to a display system including an image outputting apparatus that outputs first image information and a display apparatus, the display apparatus including a display section, a connector to which the image outputting apparatus is connectable, an activation instructor that instructs activation of the image outputting apparatus connected to the connector, a detector that detects that the activation of the image outputting apparatus has been completed, an image storage that stores second image information, and a display controller that causes the display section to display a second image corresponding to the second image information when the detector does not detect that the activation of the image outputting apparatus has been completed and causes the display section to display a first image corresponding to the first image information when the detector detects that the activation of the image outputting apparatus has been completed.

DESCRIPTION OF EXEMPLARY EMBODIMENTS

Embodiments of the present disclosure will be described below with reference to the drawings.

The embodiments of the present disclosure include a first embodiment, a second embodiment, and a third embodiment.

Figure 1:
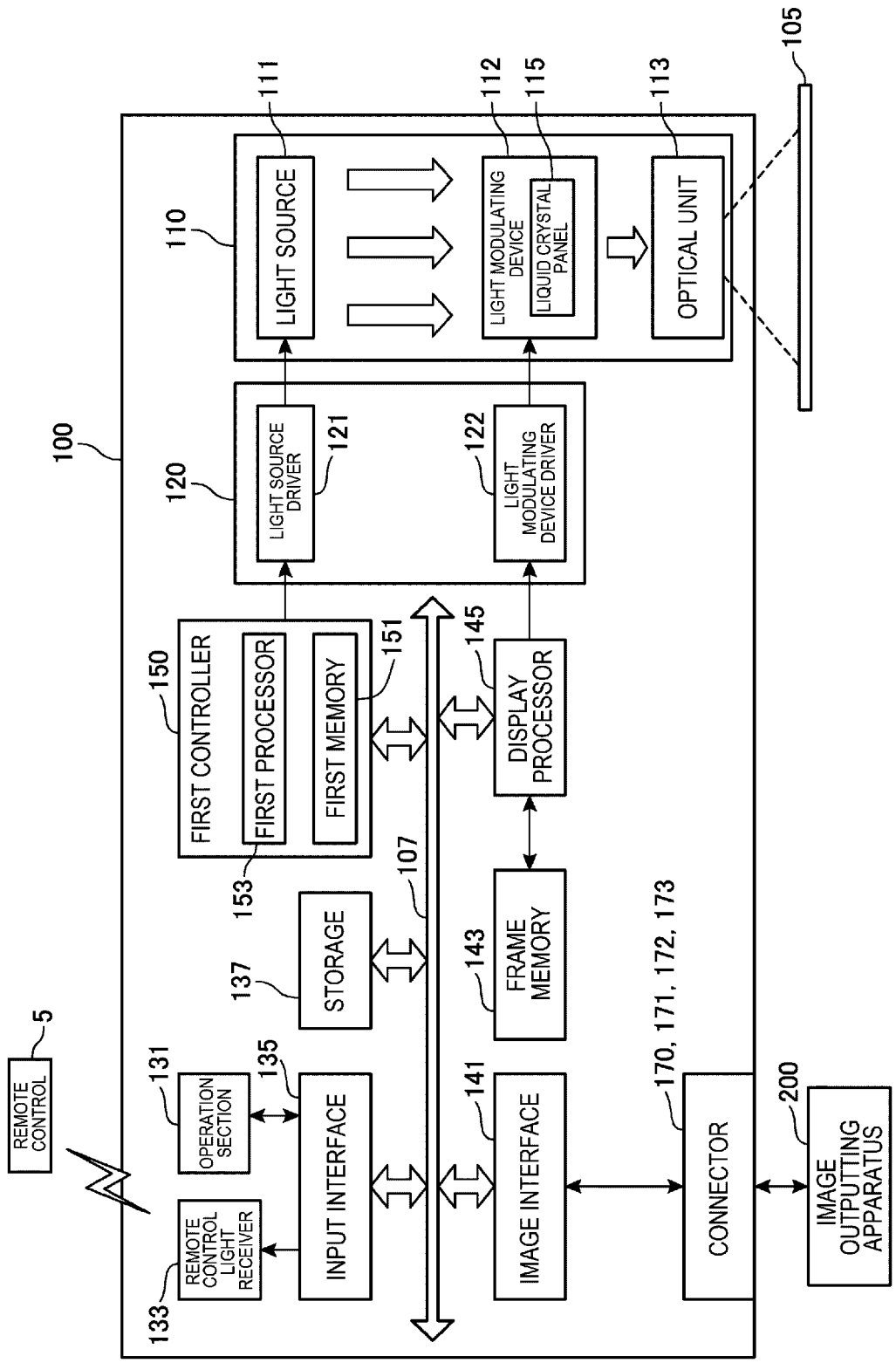
FIG. 1 shows the configuration of a projector.

The configuration of a projector 100 according to the embodiments will first be described with reference to FIG. 1. FIG. 1 is a block diagram showing the configuration of the projector 100. The projector 100 corresponds to an example of a "display apparatus." The projector 100 further corresponds to part of a "display system."

The projector 100 includes a projection section 110 and a driver 120, which drives the projection section 110. The projection section 110 corresponds to an example of a "display section." The projection section 110 includes a light source 111, a light modulator 112, and an optical unit 113. The driver 120 includes a light source driver 121 and a light modulating device driver 122.

The light source 111 includes a halogen lamp, a xenon lamp, an ultrahigh-pressure mercury lamp, or any other lamp or an LED (light emitting diode), a laser light source, or any other solid-state light source.

The light source driver 121 turns on or off the light source 111 under the control of first controller 150, which will be described later. The light source driver 121 further adjusts the luminance of the light from the light source 111 turned on by the light source driver 121.

The light modulator 112 includes a light modulating device that modulates the light outputted by the light source 111. In the present embodiment, the description will be made of a case where the light modulator 112 is formed of a transmissive liquid crystal panel 115 as the light modulating device, but not necessary in the present disclosure. The light modulating device may be a reflective liquid crystal panel 115 or a digital micromirror device.

The liquid crystal panel 115 has a plurality of pixels arranged in a matrix in the vertical and horizontal directions.

A sync signal and image data are inputted from a display processor 145, which will be described later, to the light modulating device driver 122. The light modulating device driver 122 produces a drive signal that drives the liquid crystal panel 115 based on the input image data. The light modulating device driver 122 draws an image on the liquid crystal panel 115 based on the sync signal and the drive signal. That is, the light modulating device driver 122 changes the transmittance of each of the pixels that form the liquid crystal panel 115 to the transmittance corresponding to the image. The liquid crystal panel 115 in which the pixels each have the changed transmittance thus modulates the light outputted by the light source 111 to produce image light. The produced image light enters the optical unit 113.

The optical unit 113 includes a lens and a mirror that focus the incident image light onto a projection surface 105. The optical unit 113 can be configured to include a variety of lenses or lens groups, such as a zoom lens and a focus lens.

The projector 100 further includes an operation section 131, a remote control light receiver 133, an input interface 135, a storage 137, a connector 170, an image interface 141, a frame memory 143, the display processor 145, and the first controller 150. The input interface 135, the storage 137, the image interface 141, the display processor 145, and the first controller 150 are so connected to each other via a bus 107 that they can communicate data to each other.

The operation section 131 includes a variety of buttons and switches provided on the surface of an enclosure of the projector 100, produces an operation signal corresponding to operation performed on any of the buttons and switches, and outputs the operation signal to the input interface 135. The input interface 135 outputs the operation signal inputted from the operation section 131 to the first controller 150.

The remote control light receiver 133 receives an infrared light signal transmitted from a remote control 5 and decodes the received infrared light signal to produce an operation signal. The remote control light receiver 133 outputs the produced operation signal to the input interface 135. The input interface 135 outputs the operation signal inputted from the remote control light receiver 133 to the first controller 150.

The storage 137 is, for example, a nonvolatile storage device, such as a hard disk drive and a solid-state drive (SSD). The storage 137 stores a control program executed by the first controller 150, data processed by the first controller 150, the image data, and other pieces of information.

The connector 170 is so configured that an image outputting apparatus 200 is connectable thereto. The connector 170 will be described later with reference to FIGS. 2 and 8.

The image interface 141 includes an interface circuit and is wired via the connector 170 to the image outputting apparatus 200, which supplies the projector 100 with image information. The image information supplied by the image outputting apparatus 200 may be still image information or motion image information. The image outputting apparatus 200 corresponds to part of the "display system." That is, the projector 100 and the image outputting apparatus 200 form an example of the "display system." The image outputting apparatus 200 will be described later with reference to FIG. 3.

The image interface 141 receives an image signal from the image outputting apparatus 200 and extracts image data and a sync signal contained in the received image signal. The image data is data representing the grayscale of each of the plurality of pixels on a color component basis. The sync signal is a signal representing synchronization timings and includes a horizontal sync signal and a vertical sync signal. The image interface 141 outputs the sync signal extracted from the image signal to the first controller 150 and the display processor 145 and further outputs the image data to the display processor 145. The first controller 150 determines the timing at which a process is carried out based on the horizontal and vertical sync signals and controls each portion of the projector 100 based on the determined timing. The display processor 145 performs image processing on the image data in synchronization with the horizontal and vertical sync signals and outputs the image data having undergone the image processing to the light modulating device driver 122.

The first controller 150 includes a first memory 151 and a first processor 153.

The first memory 151 is a storage device that stores a program executed by the first processor 153 and data used thereby in a nonvolatile manner. The first memory 151 is formed of a magnetic storage device, a flash ROM or any other semiconductor storage element, or any of other types of nonvolatile storage device. The first memory 151 may include a RAM that forms a work area where the first processor 153 operates. The first memory 151 stores data processed by the first controller 150 and a first control program executed by the first processor 153.

The first processor 153 may be formed of a single processor, or a plurality of processors may function as the first processor 153. The first processor 153 executes the first control program to control each portion of the projector 100. For example, the first processor 153 outputs an instruction of execution of image processing corresponding to operation received by the operation section 131 or the remote control 5 and a parameter used in the image processing to the display processor 145. An example of the parameter is a geometric correction parameter for correcting geometric distortion of an image to be projected to the projection surface 105. Further, the first processor 153 controls the light source driver 121 to turn on and off the light source 111 and adjust the luminance of the light from the light source 111.

The display processor 145 and the frame memory 143 can each be formed, for example, of an integrated circuit. The integrated circuit includes an LSI, an ASIC (application specific integrated circuit), and a PLD (programmable logic device). The PLD includes, for example, an FPGA (field-programmable gate array). Part of the configuration of the integrated circuit may include an analog circuit, and the integrated circuit may be combined with a processor. The combination of a processor and an integrated circuit is called, for example, a microcontroller (MCU), an SoC (system-on-a-chip), a system LSI, and a chip set.

The display processor 145 develops the image data inputted via the image interface 141 in the frame memory 143. The frame memory 143 includes a plurality of banks. The banks each have storage capacity that allows image data corresponding to one frame to be written onto the bank. The frame memory 143 is formed, for example, of an SDRAM (synchronous dynamic random access memory).

The display processor 145 performs image processing, for example, resolution conversion, resizing, distortion correction, shape correction, digital zooming, adjustment of color tone and luminance of an image on the image data developed in the frame memory 143.

The display processor 145 further performs frame rate conversion. The frame rate conversion is the process of converting the frame frequency of the frames that form the image data drawn on the liquid crystal panel 115 into a frequency different from the frame frequency of the frames that form the image data supplied from the image outputting apparatus 200. The frame frequency represents the number of pixels displayed per second, which is a unit period, and corresponds to the frequency of the vertical sync signal. The frame frequency of the frames that form the image data supplied from the image outputting apparatus 200 is called an input frame frequency, and the frame frequency of the frames that form the image data drawn on the liquid crystal panel 115 is called a drawing frequency.

The display processor 145 converts the input frequency associated with the vertical sync signal into the drawing frequency to produce a vertical sync signal associated with the drawing frequency. The thus produced vertical sync signal is called an output sync signal. The display processor 145 outputs the produced output sync signal to the light modulating device driver 122.

In a case where the input frame frequency, that is, the frequency of the vertical sync signal is 60 Hz, the display processor 145 produces an output sync signal having, for example, a drawing frequency of 120 Hz, which 60 Hz times 2, or a drawing frequency of 240 Hz, which is 60 Hz times 4. The display processor 145 outputs the image data read from the frame memory 143 along with the produced output sync signal to the light modulating device driver 122. The light modulating device driver 122 performs a double-speed process of drawing an image on the liquid crystal panel 115 in synchronization with the inputted output sync signal.

Further, the display processor 145 produces a plurality of sub-frames from one frame of the image data. The sub-frames are formed of imaged data to be displayed in the period for which image data corresponding to one frame is displayed. The display processor 145 reads the same image data from the frame memory 143 multiple times to produce sub-frames. In the present embodiment, the display processor 145 divides the image data into a plurality of areas and produces sub-frames on a divided area basis.

Figure 2:
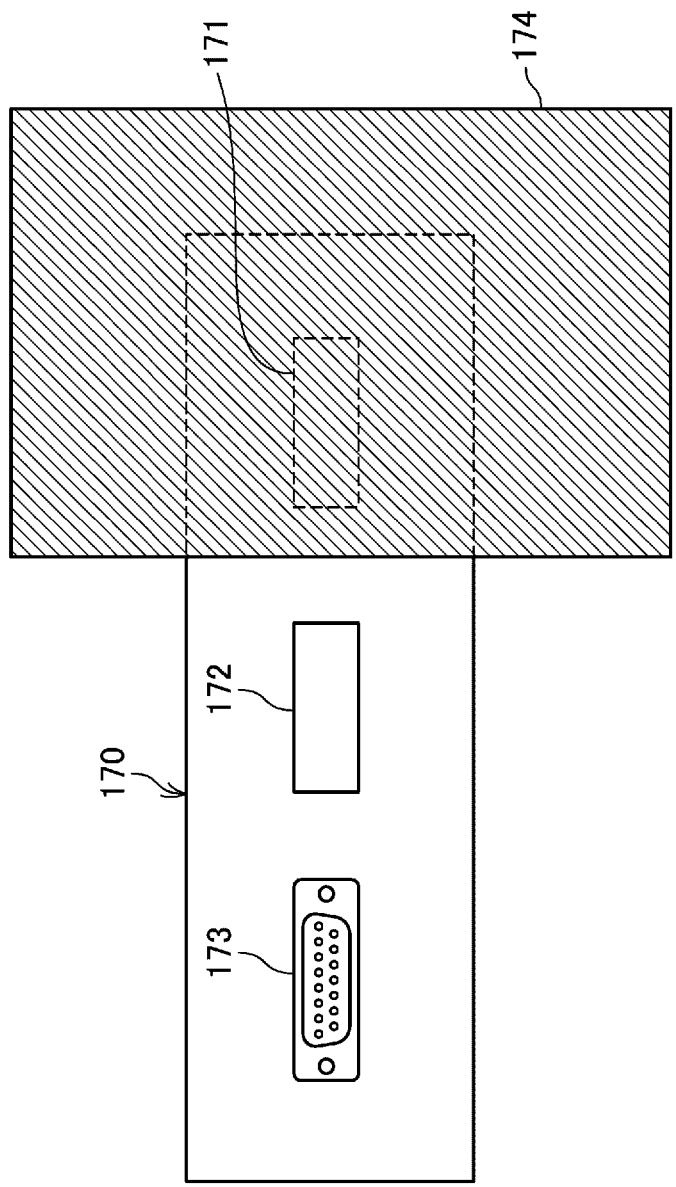
FIG. 2 shows the configuration of a connector in first and second embodiments.

The configuration of the connector 170 in the first and second embodiments of the present disclosure will next be described with reference to FIGS. 1 and 2. FIG. 2 shows the configuration of the connector 170. The connector 170 includes a first connector 171, a second connector 172, and a third connector 173, as shown in FIG. 2.

The first connector 171 is, for example, an HDMI (registered trademark: High-Definition Multimedia Interface) connector. The first connector 171 is so configured that the image outputting apparatus 200 is connectable thereto. The image outputting apparatus 200 is coupled to the first connector 171 in the first and second embodiments of the present disclosure.

To prevent a user from disconnecting the image outputting apparatus 200 from the first connector 171, the enclosure of the projector 100 is provided with a restriction member 174. The restriction member 174 is a plate-shaped member that covers the first connector 171 and the image outputting apparatus 200 connected to the first connector 171. The restriction member 174 is formed integrally with the enclosure of the projector 100. For example, the restriction member 174 is fixed to the enclosure of the projector 100 with bolts.

The second 172 is, for example, an HDMI connector. The second connector 172 is so configured that the image outputting apparatus 200 is connectable thereto.

The third connector 173 is, for example, a D-sub (D-subminiature) connector. For example, a personal computer is connected to the third connector 173.

The third connector 173 corresponds to an example of a "second connector" in some cases. That is, the second connector 172 and the third connector 173 each correspond to an example of the "second connector" in some cases.

In the first and second embodiments of the present disclosure, the first connector 171 is, for example, an HDMI connector, but not necessarily in the present disclosure. The first connector 171 may instead be a USB (universal serial bus) connector. The first connector 171 may still instead be a connector capable of communication based on the Ethernet (registered trademark) standard.

Figure 3:
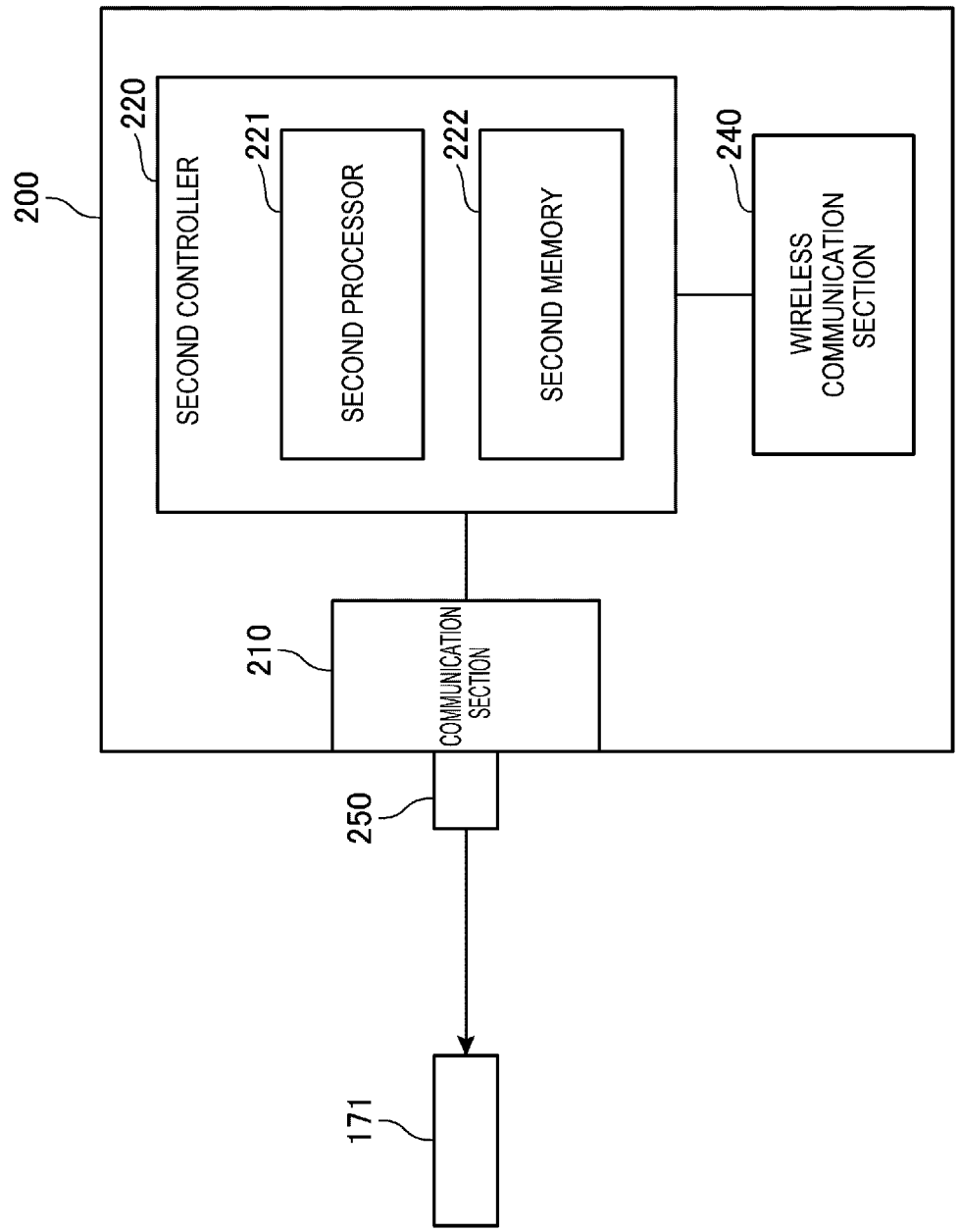
FIG. 3 shows the configuration of an image outputting apparatus.

The configuration of the image outputting apparatus 200 in the embodiments of the present disclosure will next be described with reference to FIGS. 1 to 3. FIG. 3 shows the configuration of the image outputting apparatus 200. The image outputting apparatus 200 outputs first image information PJ1 to the projector 100 via the connector 170. The image outputting apparatus 200 includes a communication section 210, a second controller 220, a wireless communication section 240, and an HDMI terminal 250, as shown in FIG. 3. The image outputting apparatus 200 is formed, for example, in a stick-like shape.

Specifically, the image outputting apparatus 200 receives streaming images distributed, for example, via a network, transmits the images to the projector 100 connected to the image outputting apparatus 200, and causes the projector 100 to display the images. The image outputting apparatus 200 itself does not display the streaming images received via the network.

The communication section 210 communicates with the first controller 150 of the projector 100 shown in FIG. 1 via the HDMI terminal 250 and the first connector 171. The HDMI terminal 250 is connected to the first connector 171.

The second controller 220 includes a second memory 222 and a second processor 221.

The second memory 222 is a storage device that stores a program executed by the second processor 221 and data used thereby in a nonvolatile manner. The second memory 222 is formed of a magnetic storage device, a flash ROM or any other semiconductor storage element, or any of other types of nonvolatile storage device. The second memory 222 may include a RAM that forms a work area where the second processor 221 operates. The second memory 222 stores data processed by the second controller 220, a system program that functions as an OS (operating system), and a second control program executed by the second processor 221.

The second processor 221 may be formed of a single processor, or a plurality of processors may function as the second processor 221. The second processor 221 executes the second control program to output the first image information PJ1 to the projector 100.

The wireless communication section 240 is connected to the Internet over wireless communication. The wireless communication section 240 is connected to the Internet, for example, based on Wi-Fi (registered trademark). The second controller 220 receives the first image information PJ1 via the wireless communication section 240, for example, from a server apparatus or a personal computer.

In the present embodiment of the present disclosure, the second controller 220 receives the first image information PJ1 via the wireless communication section 240, but not necessarily in the present disclosure. The second controller 220 may read the first image information PJ1 from the second memory 222.

Figure 4:
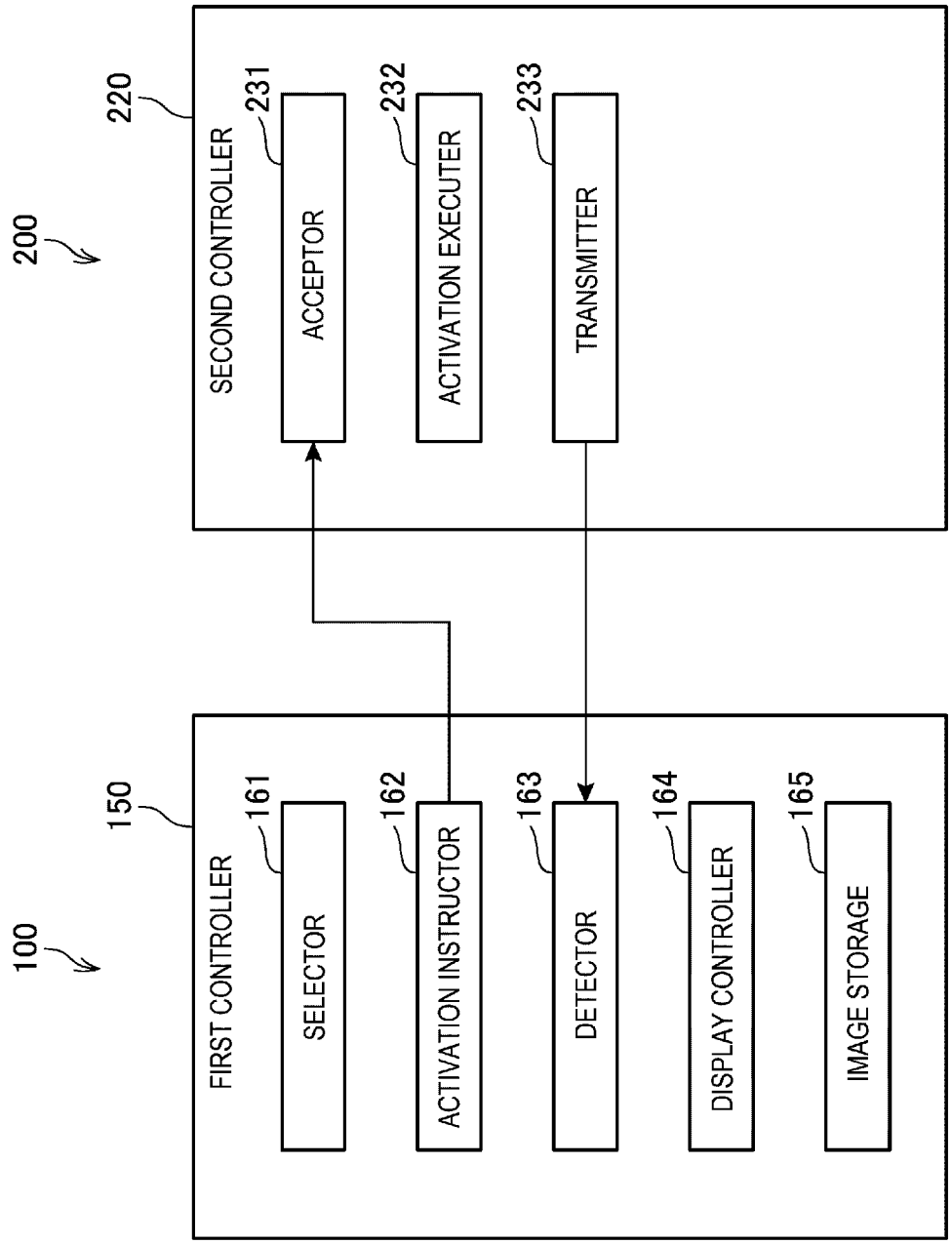
FIG. 4 shows the configurations of a first controller and a second controller.

The configurations of the first controller 150 and the second controller 220 in the embodiments of the present disclosure will next be described with reference to FIGS. 1 to 4. FIG. 4 shows the configurations of the first controller 150 and the second controller 220.

The first controller 150 includes a selector 161, an activation instructor 162, a detector 163, a display controller 164, and an image storage 165, as shown in FIG. 4. Specifically, the first processor 153 of the first controller 150 shown in FIG. 1 executes the first control program to function as the selector 161, the activation instructor 162, the detector 163, and the display controller 164. The first memory 151 functions as the image storage 165.

The second controller 220 includes an acceptor 231, an activation executer 232, and a transmitter 233, as shown in FIG. 4. Specifically, the second processor 221 of the second controller 220 shown in FIG. 3 executes the second control program to function as the acceptor 231, the activation executer 232, and the transmitter 233.

The image storage 165 stores second image information PJ2. A second image P2, which corresponds to the second image information PJ2, shows that the activation of the image outputting apparatus 200 has not been completed. The second image P2 is an image showing a string stating, for example, "Image outputting apparatus is in the middle of activation."

The selector 161 selects one of the first connector 171 to the third connector 173 shown in FIG. 2. In other words, the selector 161 selects the first connector 171 or the second connector 172. The second connector includes the second connector 172 and the third connector 173.

In the embodiments of the present disclosure, the selector 161 selects one of the first connector 171 to the third connector 173 based on the user's operation performed on the operation section 131 or the remote control 5 shown in FIG. 1.

The activation instructor 162 instructs the activation of the image outputting apparatus 200.

Specifically, the activation instructor 162 sends instruction information CJ representing that the activation of the image outputting apparatus 200 is initiated to the image outputting apparatus 200.

Further specifically, the activation instructor 162 transmits an activation command SCM to the second controller 220. The activation command SCM corresponds to an example of the instruction information CJ. That is, the activation command SCM represents an instruction of start of the activation of the image outputting apparatus 200. The activation command SCM is specified based, for example, on the HDMI-CEC (Consumer Electronics Control) standard.

The detector 163 detects that the activation of the image outputting apparatus 200 has been completed. Specifically, when the projector 100 receives completion information FJ representing that the activation of the image outputting apparatus 200 has been completed from the image outputting apparatus 200, the detector 163 detects that the activation of the image outputting apparatus 200 has been completed.

In a case where the detector 163 does not detect that the activation of the image outputting apparatus 200 has been completed, the display controller 164 causes the projection section 110 to display the second image P2 corresponding to the second image information PJ2. In a case where the detector 163 detects that the activation of the image outputting apparatus 200 has been completed, the display controller 164 receives the first image information PJ1 from the image outputting apparatus 200 and causes the projection section 110 to display a first image P1 corresponding to the first image information PJ1.

The acceptor 231 receives the instruction information CJ representing that the activation of the image outputting apparatus 200 is initiated from the projector 100. Specifically the acceptor 231 receives the activation command SCM from the activation instructor 162.

In a case where the acceptor 231 receives the instruction information CJ representing that the activation of the image outputting apparatus 200 is initiated from the projector 100, the activation executer 232 initiates the activation of the image outputting apparatus 200. Specifically, when the acceptor 231 receives activation command SCM from the activation instructor 162, the activation executer 232 carries out the process of activating the image outputting apparatus 200.

When the activation of the image outputting apparatus 200 has been completed, the transmitter 233 transmits completion information FJ representing that the activation of the image outputting apparatus 200 has been completed to the projector 100 via the connector 170. Specifically, when the activation of the image outputting apparatus 200 is completed, the transmitter 233 sends the completion information FJ to the first controller 150.

When the activation of the image outputting apparatus 200 is completed, the transmitter 233 further sends the first image information PJ1 to the projector 100 via the connector 170. Specifically, when the activation of the image outputting apparatus 200 is completed, the transmitter 233 sends the first image information PJ1 to the first controller 150.

First Embodiment

Figure 5:
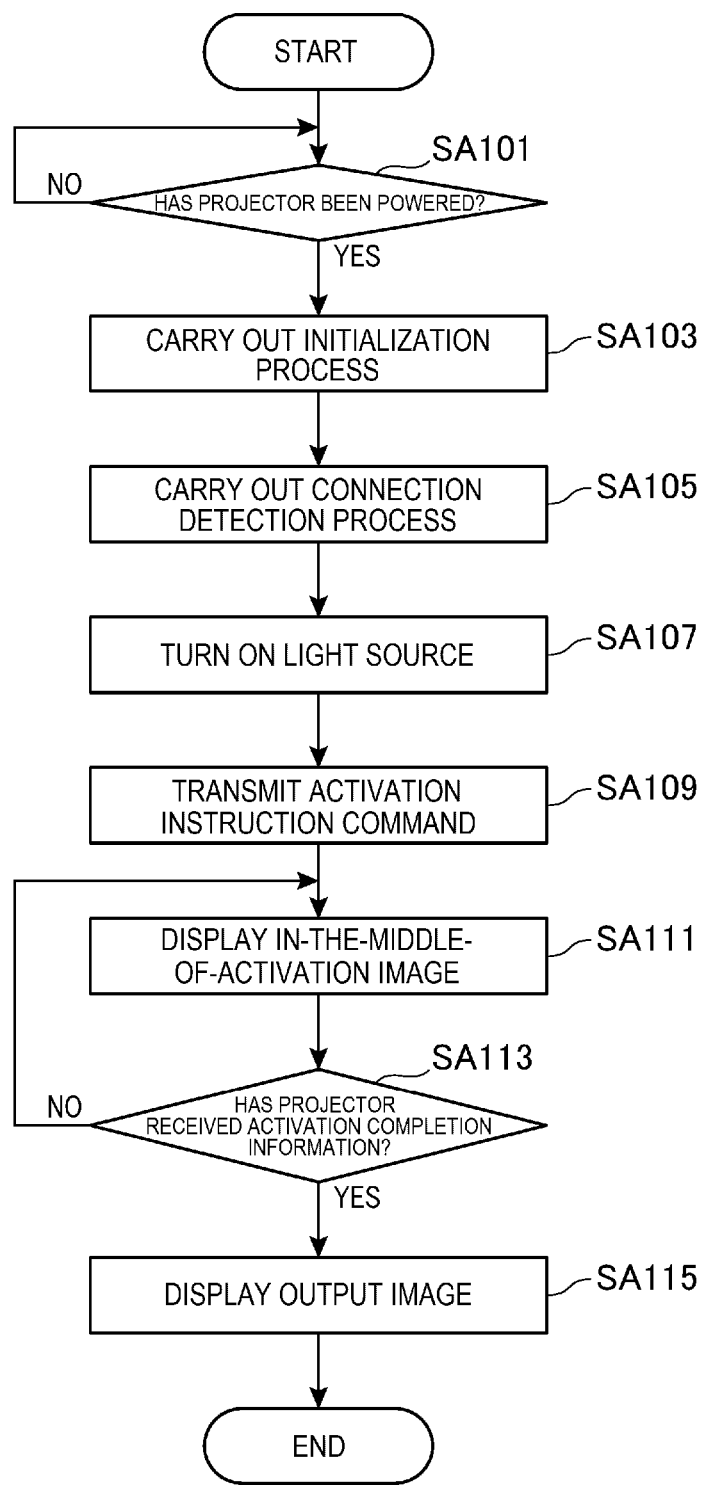
FIG. 5 is a flowchart showing processes carried out by a first controller in the first embodiment.

Processes carried out by the first controller 150 in the first embodiment of the present disclosure will next be described with reference to FIGS. 1 to 5. In the first embodiment, the image outputting apparatus 200 is connected to the first connector 171, as described with reference to FIG. 2. The selector 161 has selected the first connector 171. FIG. 5 is a flowchart showing the processes carried out by the first controller 150 in the first embodiment.

In step SA101, the first controller 150 evaluates whether or not the projector 100 has been powered, as shown in FIG. 5.

In a case where the first controller 150 determines that the projector 100 has not been powered (NO in step SA101), the process in step SA101 transitions to a standby state. In a case where the first controller 150 determines that the projector 100 has been powered (YES in step SA101), the process in step SA101 proceeds to the process in step SA103.

Thereafter, in step SA103, the first controller 150 carries out an initialization process of initializing each portion of the projector 100.

Thereafter, in step SA105, the first controller 150 carries out a connection detection process of detecting whether or not an output apparatus has been connected to the connector 170. The output apparatus is an apparatus that outputs image information and includes the image outputting apparatus 200. In the first embodiment of the present disclosure, since the image outputting apparatus 200 has been connected to the first connector 171, the first controller 150 detects that the image outputting apparatus 200 has been connected to the first connector 171.

Thereafter, in step SA107, the first controller 150 turns on the light source 111.

Thereafter, in step SA109, the activation instructor 162 transmits the activation command SCM to the second controller 220.

Thereafter, in step SA111, the display controller 164 causes the projection section 110 to display the second image P2. The second image P2 shows that the activation of the image outputting apparatus 200 has not been completed. In the following description, the second image P2 is called an "in-the-middle-of-activation image" in some cases.

Thereafter, in step SA113, the detector 163 evaluates whether or not the projector 100 has received the completion information FJ from the image outputting apparatus 200. In the embodiments of the present disclosure, the completion information FJ is called "activation completion information" in some cases.

In a case where the detector 163 determines that the projector 100 has not received the completion information FJ from the image outputting apparatus 200 (NO in step SA113), the process in step SA113 returns to the process in step SA111. In a case where the detector 163 determines that the projector 100 has received the completion information FJ from the image outputting apparatus 200 (YES in step SA113), the process in step SA113 proceeds to the process in step SA115.

Thereafter, in step SA115, the display controller 164 causes the projection section 110 to display the first image P1, and the entire processes are terminated. In the embodiments of the present disclosure, the first image P1 is called an "output image" in some cases.

Step SA109 corresponds to an example of an "activation instruction step." Step SA113 corresponds to an example of a "detection step." Step SA111 corresponds to an example of a "first display control step." Step SA115 corresponds to an example of a "second display control step."

Figure 6:
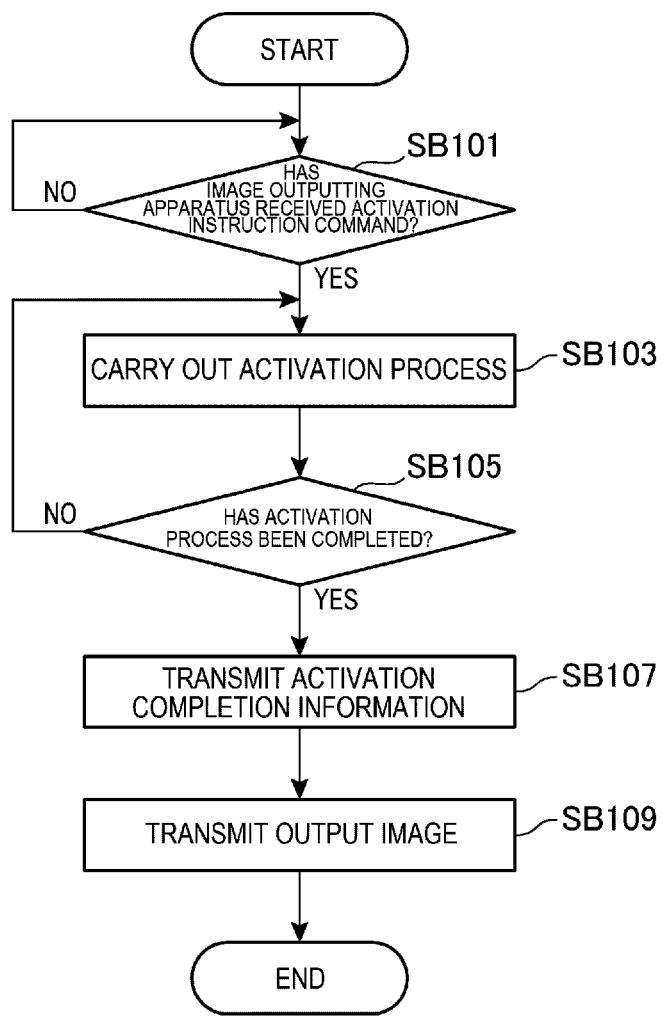
FIG. 6 is a flowchart showing processes carried out by a second controller in the first embodiment.

Processes carried out by the second controller 220 in the first embodiment will next be described with reference to FIGS. 1 to 6. FIG. 6 is a flowchart showing the processes carried out by the second controller 220 in the first embodiment.

First, in step SB101, the acceptor 231 evaluates whether or not the activation command SCM has been received from the activation instructor 162, as shown in FIG. 6.

In a case where the acceptor 231 determines that the image outputting apparatus 200 has not received the activation command SCM from the activation instructor 162 (NO in step SB101), the process in step SB101 transitions to a standby state. In a case where the acceptor 231 determines that the image outputting apparatus 200 has received the activation command SCM from the activation instructor 162 (YES in step SB101), the process in step SB101 proceeds to the process in step SB103.

Thereafter, in step SB103, the activation executer 232 carries out the activation process of activating the image outputting apparatus 200.

Thereafter, in step SB105, the transmitter 233 evaluates whether or not the activation process of activating the image outputting apparatus 200 has been completed.

In a case where the transmitter 233 determines that the activation process of activating the image outputting apparatus 200 has not been completed (NO in step SB105), the process in step SB105 returns to the process in step SB103. In a case where the transmitter 233 determines that the activation process of activating the image outputting apparatus 200 has been completed (YES in step SB105), the process in step SB105 proceeds to the process in step SB107.

Thereafter, in step SB107, the transmitter 233 transmits the completion information FJ representing that the activation of the image outputting apparatus 200 has been completed to the first controller 150.

Thereafter, in step SB109, the transmitter 233 transmits the first image information PJ1 to the first controller 150, and the entire processes are terminated.

As described above with reference to FIGS. 1 to 6, in the first embodiment of the present disclosure, the activation instructor 162 instructs the activation of the image outputting apparatus 200. The detector 163 detects that the activation of the image outputting apparatus 200 has been completed. The image storage 165 stores the second image information PJ2. In the case where the detector 163 does not detect that the activation of the image outputting apparatus 200 has been completed, the display controller 164 causes the projection section 110 to display the second image P2 corresponding to the second image information PJ2. In the case where the detector 163 detects that the activation of the image outputting apparatus 200 has been completed, the display controller 164 causes the projection section 110 to display the first image P1 corresponding to the first image information PJ1.

In the case where the detector 163 does not detect that the activation of the image outputting apparatus 200 has been completed, the projection section 110 displays the second image P2 corresponding to the second image information PJ2, whereby the user's convenience can be improved.

That is, when the activation of the image outputting apparatus 200 has not been completed, the second image P2 is displayed, whereby the user can grasp that the activation of the image outputting apparatus 200 has not been completed. Further, the user can grasp, for example, that the projector 100 is normally operating.

In the first embodiment of the present disclosure, the second image P2 shows that the activation of the image outputting apparatus 200 has not been completed. The user can therefore positively grasp that the activation of the image outputting apparatus 200 has not been completed.

In the first embodiment of the present disclosure, when the activation of the projector 100 is initiated, the activation instructor 162 instructs the activation of the image outputting apparatus 200. Specifically, when the projector 100 is powered, followed by completion of the initialization process and the connection detection process and activation of the light source 111, the activation instructor 162 instructs the activation of the image outputting apparatus 200, as described with reference to FIG. 5.

The activation instructor 162 can therefore instruct the activation of the image outputting apparatus 200 at a proper timing. In other words, the activation instructor 162 can promptly instruct the activation of the image outputting apparatus 200.

In the first embodiment of the present disclosure, when the activation of the projector 100 is initiated, the activation instructor 162 sends the instruction information CJ representing that the activation of the image outputting apparatus 200 is initiated to the image outputting apparatus 200. When the process of activating the image outputting apparatus 200 has been completed, the detector 163 receives the completion information FJ representing that the activation of the image outputting apparatus 200 has been completed from the image outputting apparatus 200. Further, having received the completion information FJ from the image outputting apparatus 200, the detector 163 detects that the activation of the image outputting apparatus 200 has been completed.

The detector 163, which has a simple configuration, can therefore reliably detect that the activation of the image outputting apparatus 200 has been completed.

In the first embodiment of the present disclosure, the display apparatus is the projector 100.

The first image P1 and the second image P2 can therefore be each displayed in a size desired by the user.

In the first embodiment of the present disclosure, the first connector 171 is an HDMI connector.

The projector 100 can therefore receive the second image P2 corresponding to the second image information PJ2 outputted from the image outputting apparatus 200 with degradation of the quality of the second image P2 suppressed. The projector 100 can therefore display the second image P2 having high quality.

In the first embodiment of the present disclosure, the image outputting apparatus 200 includes the second controller 220. When the second controller 220 receives the instruction information CJ representing that the activation of the image outputting apparatus 200 is initiated from the projector 100, the second controller 220 initiates the activation of the image outputting apparatus 200. When the activation of the image outputting apparatus 200 is completed, the second controller 220 sends the completion information FJ representing that the activation of the image outputting apparatus 200 has been completed to the projector 100 via the connector 170.

The projector 100, which has a simple configuration, can therefore reliably detect that the activation of the image outputting apparatus 200 has been completed.

Second Embodiment

Processes carried out by the first controller 150 in a second embodiment of the present disclosure will next be described with reference to FIGS. 1 to 4 and FIGS. 6 and 7. In the second embodiment, the image outputting apparatus 200 has been connected to the first connector 171, as described with reference to FIG. 2. The selector 161 has selected one of the first connector 171 to the third connector 173.

That is, the selector 161 selects the first connector 171 in the first embodiment. In contrast, the second embodiment differs from the first embodiment in that the selector 161 selects one of the first connector 171 to the third connector 173.

Figure 7:
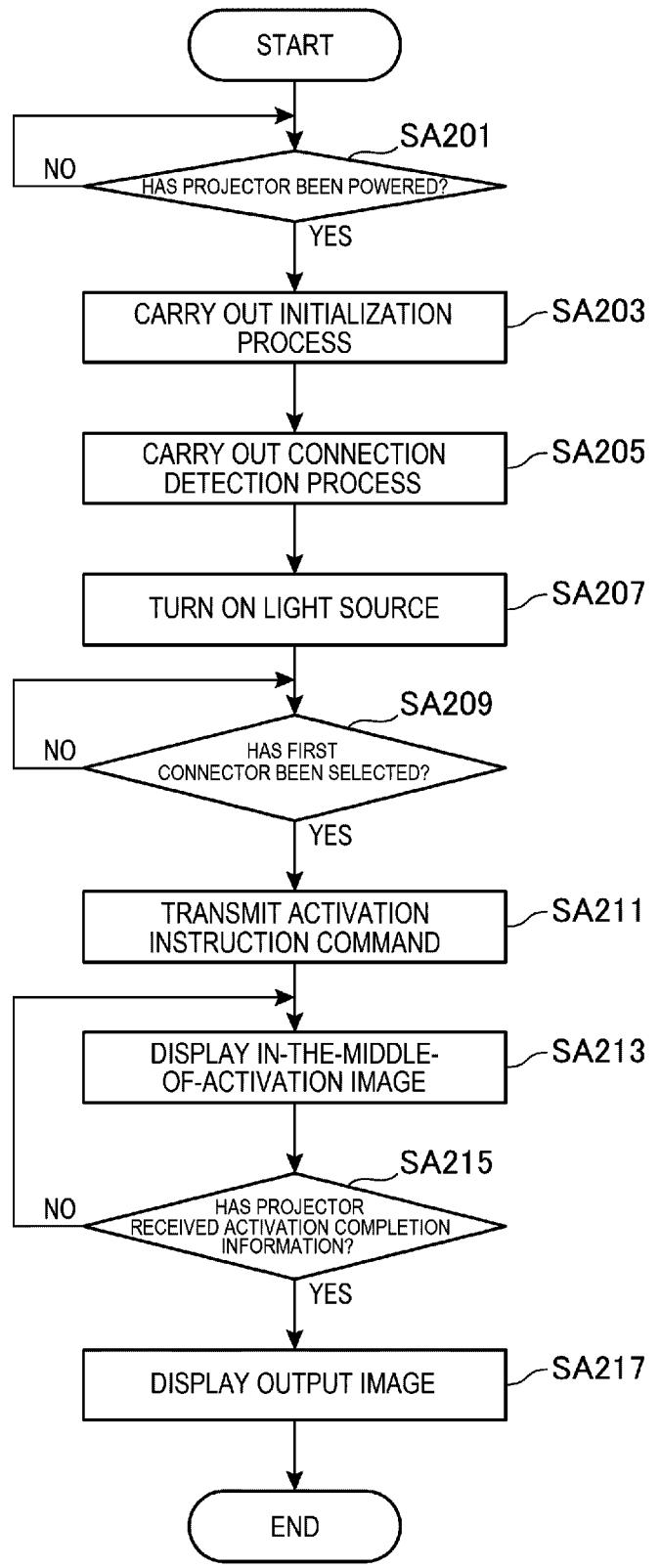
FIG. 7 is a flowchart showing processes carried out by the first controller in a second embodiment.

FIG. 7 is a flowchart showing the processes carried out by the first controller 150 in the second embodiment of the present disclosure. In the following description, processes different from those in the flowchart shown in FIG. 5 will be described, and the same processes as those in the flowchart shown in FIG. 5 will not be described.

Further, the flowchart showing the processes carried out by the second controller 220 in the second embodiment of the present disclosure is the same as the flowchart showing the processes carried out by the second controller 220 in the first embodiment of the present disclosure shown in FIG. 6 and will therefore not be described.

Steps SA201 to SA207 in the flowchart in FIG. 7 correspond to steps SA101 to SA107 in the flowchart shown in FIG. 5, respectively. Steps SA201 to SA207 will therefore not be described.

In step SA209, the selector 161 evaluates whether or not it has selected the first connector 171, as shown in FIG. 7.

In a case where the selector 161 determines that it has not selected the first connector 171 (NO in step SA209), the process in step SA209 transitions to a standby state. In a case where the selector 161 determines that it has selected the first connector 171 (YES in step SA209), the process in step SA209 proceeds to the process in step SA211.

Thereafter, in step SA211, the activation instructor 162 transmits the activation command SCM to the second controller 220.

That is, when the selector 161 selects the first connector 171, the activation instructor 162 instructs the activation of the image outputting apparatus 200. Specifically, when the state in which the selector 161 selects the second connector 172 or the third connector 173 transitions to the state in which the selector 161 selects the first connector 171, the activation instructor 162 instructs the activation of the image outputting apparatus 200.

Steps SA213 to SA217 in the flowchart shown in FIG. 7 correspond to steps SA111 to SA115 in the flowchart shown in FIG. 5, respectively. Steps SA213 to SA217 will therefore not be described.

Step SA209 corresponds to an example of a "selection step."

As described above with reference to FIGS. 1 to 4 and FIGS. 6 and 7, when the selector 161 selects the first connector 171 in the second embodiment of the present disclosure, the activation instructor 162 instructs the activation of the image outputting apparatus 200.

The activation instructor 162 can therefore instruct the activation of the image outputting apparatus 200 at a proper timing. In other words, the activation instructor 162 can promptly instruct the activation of the image outputting apparatus 200.

In the second embodiment of the present disclosure, when the state in which the selector 161 selects the second connector 172 or the third connector 173 transitions to the state in which the selector 161 selects the first connector 171, the activation instructor 162 carries out the following process: That is, the activation instructor 162 instructs the activation of the image outputting apparatus 200.

The activation instructor 162 can therefore instruct the activation of the image outputting apparatus 200 at a more proper timing. In other words, the activation instructor 162 can more promptly instruct the activation of the image outputting apparatus 200.

Further, in the second embodiment of the present disclosure, when the state in which the selector 161 selects the second connector 172 or the third connector 173 transitions to the state in which the selector 161 selects the first connector 171, the activation instructor 162 carries out the following process: That is, the activation instructor 162 sends the instruction information CJ representing that the activation of the image outputting apparatus 200 is initiated to the image outputting apparatus 200. When the activation of the image outputting apparatus 200 is completed, the detector 163 receives completion information FJ representing that the activation of the image outputting apparatus 200 has been completed from the image outputting apparatus 200. Further, having received the completion information FJ from the image outputting apparatus 200, the detector 163 detects that the activation of the image outputting apparatus 200 has been completed.

The detector 163, which has a simple configuration, can therefore reliably detect that the activation of the image outputting apparatus 200 has been completed.

Third Embodiment

Figure 8:
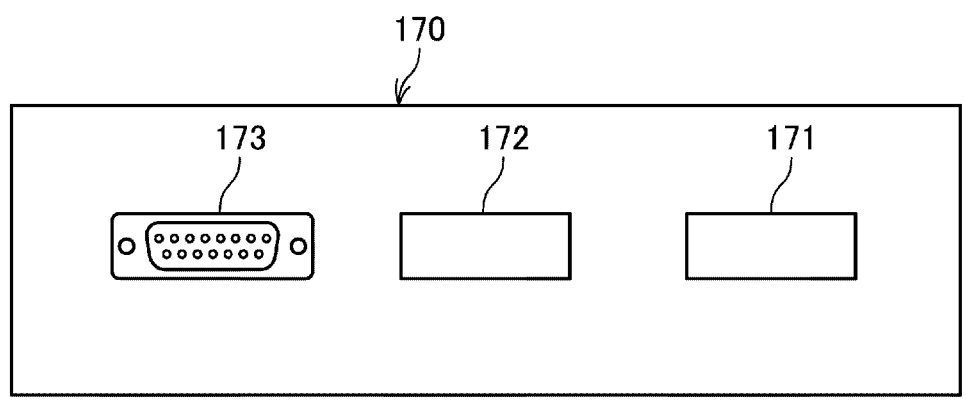
FIG. 8 shows the configuration of the connector in a third embodiment.

The projector 100 according to a third embodiment of the present disclosure will next be described with reference to FIGS. 1, 3, 4, 6, 8, and 9. The configuration of the connector 170 in the third embodiment of the present disclosure will first be described. FIG. 8 shows the configuration of the connector 170 in the third embodiment of the present disclosure. The connector 170 includes the first connector 171, the second connector 172, and the third connector 173, as shown in FIG. 8.

The following description will be made of the connector 170 in the third embodiment shown in FIG. 8 about points different from those of the connector 170 in the first embodiment shown in FIG. 2, and the same configurations as those of the connector 170 shown in FIG. 2 will not be described.

The second connector 172 shown in FIG. 8 has the same configuration as that of the second connector 172 shown in FIG. 2. The second connector 172 will therefore not be described. The third connector 173 shown in FIG. 8 has the same configuration as that of the third connector 173 shown in FIG. 2. The third connector 173 will therefore not be described.

The first connector 171 shown in FIG. 2 differs from the first connector 171 shown in FIG. 8 in that the image outputting apparatus 200 is connected to the former but the image outputting apparatus 200 is configured to be connectable to the latter. That is, in the third embodiment of the present disclosure, the image outputting apparatus 200 is connected to the first connector 171 in some cases, and the image outputting apparatus 200 is not connected to the first connector 171 in other cases.

The projector 100 shown in FIG. 2 differs from the projector 100 shown in FIG. 8 in that the enclosure of the former is provided with the restriction member 174 but the enclosure of the latter is provided with no restriction member 174. That is, in the third embodiment of the present disclosure, the first connector 171 is so configured that the image outputting apparatus 200 is attachable thereto and detachable therefrom.

Figure 9:
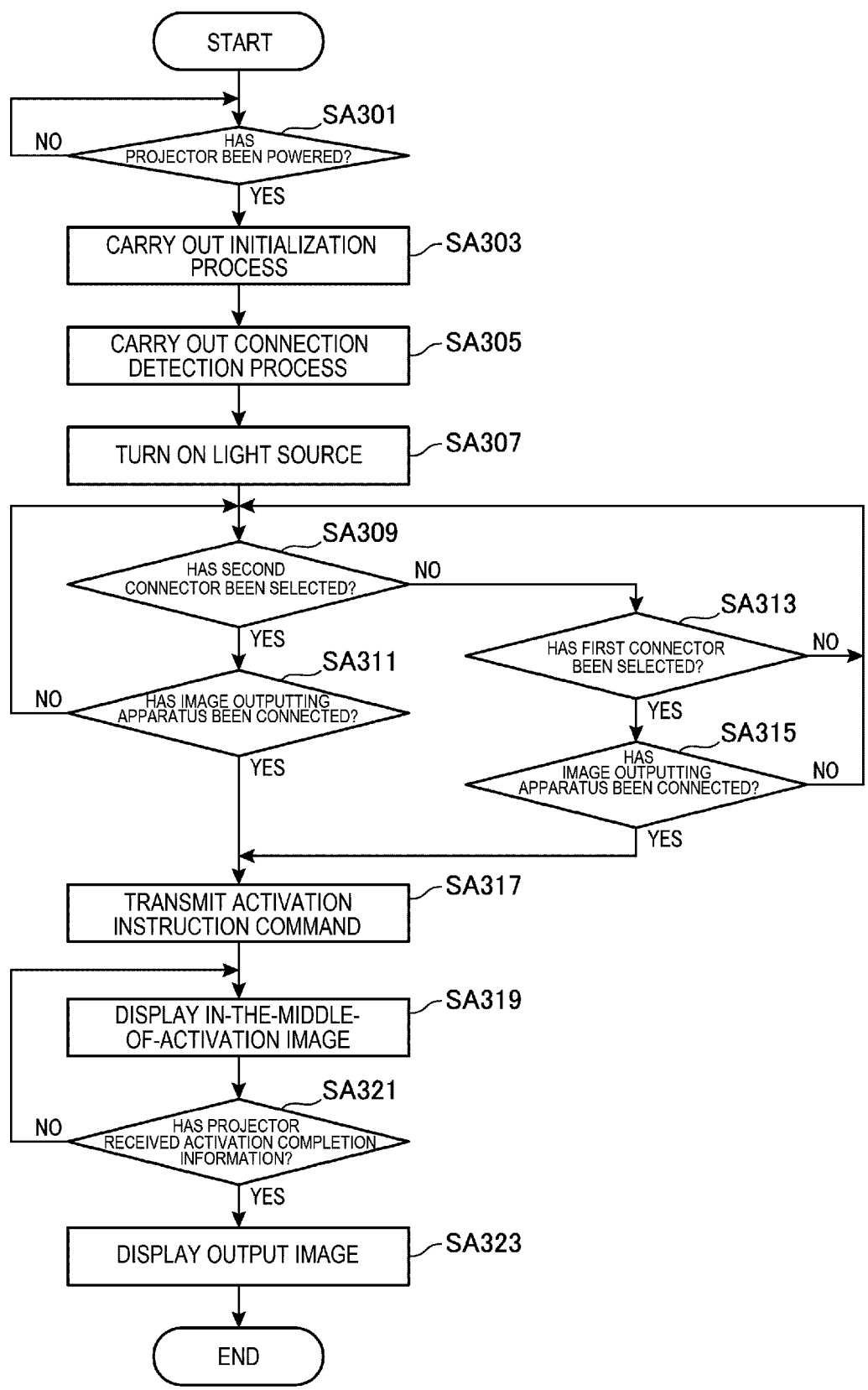
FIG. 9 is a flowchart showing processes carried out by the first controller in a third embodiment.

Processes carried out by the first controller 150 in the third embodiment of the present disclosure will next be described with reference to FIG. 9. FIG. 9 is a flowchart showing the processes carried out by the first controller 150 in the third embodiment. In the following description, processes different from those in the flowchart shown in FIG. 5 will be described, and the same processes as those in the flowchart shown in FIG. 5 will not be described.

Further, the flowchart showing the processes carried out by the second controller 220 in the third embodiment of the present disclosure is the same as the flowchart showing the processes carried out by the second controller 220 in the first embodiment of the present disclosure shown in FIG. 6 and will therefore not be described.

Steps SA301 to SA307 in the flowchart shown in FIG. 9 correspond to steps SA101 to SA107 in the flowchart shown in FIG. 5, respectively. Steps SA301 to SA307 will therefore not be described.

In step SA309, the selector 161 evaluates whether or not it has selected the second connector 172, as shown in FIG. 9.

In a case where the selector 161 determines that it has not selected the second connector 172 (NO in step SA309), the process in step SA309 proceeds to the process in step SA313. In a case where the selector 161 determines that it has selected the second connector 172 (YES in step SA309), the process in step SA309 proceeds to the process in step SA311.

Thereafter, in step SA311, the first controller 150 evaluates whether or not the image outputting apparatus 200 has been connected to the second connector 172.

In a case where the first controller 150 determines that the image outputting apparatus 200 has not been connected to the second connector 172 (NO in step SA311), the process in step SA311 returns to the process in step SA309. In a case where the first controller 150 determines that the image outputting apparatus 200 has been connected to the second connector 172 (YES in step SA311), the process in step SA311 proceeds to the process in step SA317.

In a case where the selector 161 determines that the second connector 172 has not be selected (NO in step SA309), the selector 161 evaluates in step SA313 whether or not it has selected the first connector 171.

In a case where the selector 161 determines that it has not selected the first connector 171 (NO in step SA313), the process in step SA313 returns to the process in step SA309. In a case where the selector 161 determines that it has selected the first connector 171 (YES in step SA313), the process in step SA313 proceeds to the process in step SA315.

Thereafter, in step SA315, the first controller 150 evaluates whether or not the image outputting apparatus 200 has been connected to the first connector 171.

In a case where the first controller 150 determines that the image outputting apparatus 200 has not been connected to the first connector 171 (NO in step SA315), the process in step SA315 returns to the process in step SA309. In a case where the first controller 150 determines that the image outputting apparatus 200 has been connected to the first connector 171 (YES in step SA315), the process in step SA315 proceeds to the process in step SA317.

Thereafter, in step SA317, the activation instructor 162 transmits the activation command SCM to the second controller 220.

That is, when the image outputting apparatus 200 is connected to the second connector 172, the following process is carried out: That is, when the state in which the selector 161 selects the first connector 171 or the third connector 173 transitions to the state in which the selector 161 selects the second connector 172, the activation instructor 162 instructs the activation of the image outputting apparatus 200.

In the case where the selector 161 has selected the second connector 172, the following process is carried out: That is, when the image outputting apparatus 200 is connected to the second connector 172, the activation instructor 162 instructs the activation of the image outputting apparatus 200.

Steps SA319 to SA323 in the flowchart shown in FIG. 9 correspond to steps SA111 to SA115 in the flowchart shown in FIG. 5, respectively. Steps SA319 to SA323 will therefore not be described.

Steps SA309 to SA315 correspond to an example of the "selection step."

As described above with reference to FIGS. 1, 3, 4, 6, 8, and 9, when the image outputting apparatus 200 is connected to the second connector 172 in the third embodiment of the present disclosure, the following process is carried out: That is, when the state in which the selector 161 selects the first connector 171 or the third connector 173 transitions to the state in which the selector 161 selects the second connector 172, the activation instructor 162 instructs the activation of the image outputting apparatus 200.

The activation instructor 162 can therefore instruct the activation of the image outputting apparatus 200 connected to the second connector 172 at a proper timing. In other words, the activation instructor 162 can promptly instruct the activation of the image outputting apparatus 200 connected to second connector 172.

In the third embodiment of the present disclosure, when the selector 161 has selected the second connector 172, the following process is carried out: That is, when the image outputting apparatus 200 is connected to the second connector 172, the activation instructor 162 instructs the activation of the image outputting apparatus 200.

The activation instructor 162 can therefore instruct the activation of the image outputting apparatus 200 connected to the second connector 172 at a proper timing. In other words, the activation instructor 162 can promptly instruct the activation of the image outputting apparatus 200 connected to the second connector 172.

The embodiments described above are preferable forms in which the present disclosure is implemented. The present disclosure is, however, not limited to the embodiments described above, and a variety of changes can be made thereto to the extent that the changes do not depart from the substance of the present disclosure.

For example, the process units in the flowcharts shown in FIGS. 5, 7, and 9 are process units divided in accordance with the contents of the primary processes for easy understanding of the processes carried out by the projector 100. How to produce the divided process units shown in the flowcharts of FIGS. 5, 7, and 9 or the names of the process units do not limit the embodiments of the present disclosure. In accordance with the content of a process carried out by the projector 100, the process can be further divided into a larger number of process units, and each of the process units can further be divided into a large number of processes. Further, the orders in which the processes are carried out in the flowcharts described above are not limited to those shown in FIGS. 5, 7, and 9.

Further, for example, the process units in the flowchart shown in FIG. 6 are process units divided in accordance with the contents of the primary processes for easy understanding of the processes carried out by the image outputting apparatus 200. How to produce the divided process units shown in the flowchart of FIG. 6 or the names of the process units do not limit the embodiments of the present disclosure. In accordance with the content of a process carried out by the image outputting apparatus 200, the process can be further divided into a larger number of process units, and each of the process units can further be divided into a large number of processes. Further, the order in which the processes are carried out in the flowchart described above is not limited to that shown in FIG. 6.

Further, for example, in the embodiments described above, the projector 100 has been presented as an example of the display apparatus. The display apparatus according to any of the embodiments of the present disclosure may instead be a liquid crystal monitor, a liquid crystal television, or any other liquid crystal apparatus that display an image on a liquid crystal display panel. The display apparatus according to any of the embodiments of the present disclosure may still instead be an apparatus including a plasma display panel, an OLED (organic light-emitting diode), or an organic EL display panel, such as an OEL (organic electro luminescence) display.

Each of the functional portions shown in FIGS. 1, 3, and 4 represents a functional configuration and is not necessarily implemented in a specific form. That is, hardware corresponding to each of the functional portions is not necessarily implemented, and a single processor that executes a program can, of course, achieve the functions of the plurality of functional portions. Further, part of the functions achieved by software in the embodiments described above may be achieved by hardware, or part of the functions achieved by hardware may be achieved by software. In addition, the specific detailed configuration of each of the other portions in the projector 100 can be arbitrarily changed to the extent that the change does not depart from the substance of the present disclosure.

The method for controlling the projector 100 according to any of the embodiments of the present disclosure can be achieved by causing a computer provided in the projector 100 to execute a program corresponding to the method for controlling the projector 100. The program can be recorded on a computer readable recording medium. The recording medium can be a magnetic recording medium, an optical recording medium, or a semiconductor memory device. Specific examples of the recording medium may include a flexible disk, an HDD (hard disk drive), a CD-ROM (compact disk read only memory), a DVD (digital versatile disk), a Blu-ray (registered trademark) disc, a magneto-optical disk, a flash memory, a portable recording medium, such as a card-shaped recording medium, or an immobile recording medium. The recording medium may instead be a RAM (random access memory), a ROM (read only memory), or an HDD or any other nonvolatile storage device that is an internal storage device provided in an image processing apparatus. The method for controlling the projector 100 can also be achieved by storing the program corresponding to the method for controlling the projector 100, for example, in a server apparatus and downloading the program from the server apparatus to the projector 100.

What is claimed is:
1. A display apparatus comprising:
a display section;
a first connector to which an image outputting apparatus that outputs first image information is connectable;
one or more processors; and
an image storage that stores second image information, wherein the one or more processors instructs activation of the image outputting apparatus connected to the first connector by sending instruction information representing that the activation of the image outputting apparatus is initiated to the image outputting apparatus when activation of the display apparatus is initiated, wherein the one or more processors receives completion information representing that the activation of the image outputting apparatus has been completed from the image outputting apparatus when the activation of the image outputting apparatus has been completed, wherein the one or more processors detects that the activation of the image outputting apparatus has been completed when the one or more processors receives the completion information from the image outputting apparatus, wherein the completion information is separate from the first image information, wherein the one or more processors causes the display section to display a second image corresponding to the second image information when the one or more processors does not detect that the activation of the image outputting apparatus has been completed, and wherein the one or more processors causes the display section to display a first image corresponding to the first image information and not display the second image when the one or more processors detects that the activation of the image outputting apparatus has been completed.

2. The display apparatus according to claim 1, wherein the second image is an image showing that the image outputting apparatus is in middle of activation.

3. The display apparatus according to claim 1, further comprising:
a second connector; and
a selector that selects the first or second connector,
wherein the one or more processors instructs the activation of the image outputting apparatus connected to the first connector when the selector selects the first connector.

4. The display apparatus according to claim 3, wherein when a state in which the selector selects the second connector transitions to a state in which the selector selects the first connector, the one or more processors instructs the activation of the image outputting apparatus.

5. The display apparatus according to claim 4,
wherein when the state in which the selector selects the second connector transitions to the state in which the selector selects the first connector, the one or more processors sends instruction information representing that the activation of the image outputting apparatus connected to the first connector is initiated to the image outputting apparatus, the one or more processors receives completion information representing that the activation of the image outputting apparatus connected to the first connector has been completed from the image outputting apparatus when the activation of the image outputting apparatus has been completed, and the one or more processors detects that the activation of the image outputting apparatus connected to the first connector has been completed when the one or more processors receives the completion information from the image outputting apparatus.

6. The display apparatus according to claim 3,
wherein the second connector is so configured that the image outputting apparatus is connectable thereto, and when a state in which the selector selects the first connector transitions to a state in which the selector selects the second connector, the one or more processors instructs the activation of the image outputting apparatus connected to the second connector.

7. The display apparatus according to claim 4,
wherein the second connector is so configured that the image outputting apparatus is connectable thereto, and when a state in which the image outputting apparatus is not connected to the second connector transitions to a state in which the image outputting apparatus is connected to the second connector, the one or more processors instructs the activation of the image outputting apparatus connected to the second connector.

8. A method for controlling a display apparatus including a display, section, a first connector to which an image outputting apparatus that outputs first image information is connectable, and an image storage that stores second image information, the method comprising:

instructing activation of the image outputting apparatus connected to the first connector by sending instruction information representing that the activation of the image outputting apparatus is initiated to the image outputting apparatus when activation of the display apparatus is initiated;

receiving completion information representing that the activation of the image outputting apparatus has been completed from the image outputting apparatus when the activation of the image outputting apparatus has been completed;

detecting that the activation of the image outputting apparatus has been completed when the completion information is received from the image outputting apparatus;

causing the display section to display a first image corresponding to the first image information and not display a second image corresponding to the second image information when the completion of the activation of the image outputting apparatus is detected; and causing the display section to display the second image when the completion of the activation of the image outputting apparatus is not detected, wherein the completion information is separate from the first image information.

9. The method for controlling a display apparatus according to claim 8, wherein the second image is an image showing that the image outputting apparatus is in middle of activation.

10. The method for controlling a display apparatus according to claim 8,
wherein the display apparatus further includes a second connector,
the method for controlling a display apparatus further comprises selecting the first or second connector, and when the first connector is selected, the activation of the image outputting apparatus connected to the first connector is instructed during the instructing.

11. The method for controlling a display apparatus according to claim 10, wherein when a state in which the second connector is selected transitions to a state in which the first connector s selected, the activation of the image outputting apparatus is instructed during the instructing.

12. The method for controlling a display apparatus according to claim 11,
wherein when the state in which the second connector is selected transitions to the state in which the first connector is selected, instruction information representing that the activation of the image outputting apparatus connected to the first connector is initiated is sent to the image outputting apparatus during the instructing, completion information representing that the activation of the image outputting apparatus connected to the first connector has been completed is received from the image outputting apparatus during the detecting when the activation of the image outputting apparatus has been completed, and the completion of the activation of the image outputting apparatus connected to the first connector is detected during the detecting when the completion information is received from the image outputting apparatus.

13. The method for controlling a display apparatus according to claim 10, wherein the second connector is so configured that the image outputting apparatus is connectable thereto, and when a state in which the first connector is selected transitions to a state in which the second connector is selected, the activation of the image outputting apparatus connected to the second connector is instructed during the instructing.

14. The method for controlling a display apparatus according to claim 11, wherein the second connector is so configured that the image outputting apparatus is connectable thereto, and when a state in which the image outputting apparatus is not connected to the second connector transitions to a state in which the image outputting apparatus is connected to the second connector, the activation of the image outputting apparatus connected to the second connector is instructed during the instructing.

15. A display system comprising an image outputting apparatus that outputs first image information and a display apparatus, wherein the display apparatus includes:
a display section,
a connector to which the image outputting apparatus is connectable,
one or more processors, and
an image storage that stores second image information, wherein the one or more processors instructs activation of the image outputting apparatus connected to the connector by sending instruction information representing that the activation of the image outputting apparatus is initiated to the image outputting apparatus when activation of the display apparatus is initiated, wherein the one or more processors receives completion information representing that the activation of the image outputting apparatus has been completed from the image outputting apparatus when the activation of the image outputting apparatus has been completed, wherein the one or more processors detects that the activation of the image outputting apparatus has been completed when the one or more processors receives the completion information from the image outputting apparatus, wherein the completion information is separate from the first image information, wherein the one or more processors causes the display section to display a second image corresponding to the second image information when the one or more processors does not detect that the activation of the image outputting apparatus has been completed, and wherein the one or more processors causes the display section to display a first image corresponding to the first image information and not display the second image when the one or more processors detects that the activation of the image outputting apparatus has been completed.

* * * * *